United States Patent
Jimenez Haertel et al.

(10) Patent No.: US 7,093,450 B2
(45) Date of Patent: Aug. 22, 2006

(54) METHOD FOR OPERATING A COMPRESSOR

(75) Inventors: Carlos Jimenez Haertel, Munich (DE); Klaus Doebbeling, Windisch (CH)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 10/999,990

(22) Filed: Dec. 1, 2004

(65) Prior Publication Data

US 2005/0252231 A1 Nov. 17, 2005

Related U.S. Application Data

(63) Continuation of application No. PCT/EP03/50180, filed on May 20, 2003.

(30) Foreign Application Priority Data

Jun. 4, 2002 (CH) .................... 0939/02

(51) Int. Cl.
F25D 17/06 (2006.01)
(52) U.S. Cl. ............................ 62/91; 62/304
(58) Field of Classification Search ............. 62/304, 62/305, 310, 314, 401, 404, 91, 228, 510; 417/251
See application file for complete search history.

(56) References Cited

U.S. PATENT DOCUMENTS

| | | | |
|---|---|---|---|
| 2,549,819 A * | 4/1951 | Kane | 415/116 |
| 2,786,626 A * | 3/1957 | Redcay | 415/116 |
| 2,840,182 A | 6/1958 | Coulter et al. | 183/26 |
| 3,585,795 A * | 6/1971 | Grieb | 60/39.163 |
| 3,947,146 A | 3/1976 | Schuster | 415/1 |
| 4,362,462 A * | 12/1982 | Blotenberg | 415/1 |
| 4,417,847 A | 11/1983 | Kube | 415/1 |
| 4,618,310 A * | 10/1986 | Michelson | 415/1 |
| 4,693,852 A * | 9/1987 | Gordon | 261/30 |
| 5,203,161 A * | 4/1993 | Lehto | 60/39.53 |
| 5,282,726 A * | 2/1994 | Warren | 417/243 |
| 5,386,685 A | 2/1995 | Frutschi | 60/39.02 |
| 5,622,044 A | 4/1997 | Bronicki et al. | 60/39.182 |
| 5,791,159 A * | 8/1998 | Aicher et al. | 62/510 |
| 6,183,211 B1 * | 2/2001 | Wood | 417/254 |

FOREIGN PATENT DOCUMENTS

| | | |
|---|---|---|
| CA | 2091231 | 9/1993 |
| DE | 23 52 561 A1 | 4/1975 |
| DE | 42 37 665 A1 | 5/1994 |
| DE | 197 32 268 A1 | 1/1999 |
| DE | 199 13 681 A1 | 10/2000 |
| EP | 0 524 435 A2 | 1/1993 |
| EP | 0 561 011 A1 | 9/1993 |
| EP | 0 770 771 A1 | 5/1997 |
| EP | 0 903 483 A1 | 3/1999 |
| GB | 1028254 | 5/1966 |
| JP | 10-266994 A * | 10/1998 |
| JP | 10-267528 A * | 10/1998 |

* cited by examiner

Primary Examiner—Mohammad M. Ali
(74) Attorney, Agent, or Firm—Steptoe & Johnson LLP

(57) ABSTRACT

In a method of operating a compressor, a gaseous medium is compressed in a first compressor stage. The partially compressed medium is sent from the first compressor stage into an intermediate cooler where it is cooled before being directed into the second compressor stage where it is compressed further. A liquid medium is sprayed into the gaseous medium in the intermediate cooler so that a two-phase mixture with a liquid phase and a gaseous phase is formed in the intermediate cooler. The liquid phase is separated again before adding it to the second compressor stage.

21 Claims, 2 Drawing Sheets

METHOD FOR OPERATING A COMPRESSOR

CROSS-REFERENCE TO RELATED APPLICATIONS

This application is a continuation of the U.S. National Stage designation of co-pending International Patent Application PCT/EP03/50180 filed May 20, 2003, the entire content of which is expressly incorporated herein by reference thereto.

FIELD OF THE INVENTION

The present invention relates to a method for operating a compressor.

BACKGROUND OF THE INVENTION

Two different methods of increasing the power of gas turbines based on cooling the air mass flow are known from the state of the art. Cooling of the air mass flow received by the gas turbine results in an increased power output by the machine. The reasons include first the increased mass flow of air due to the cooling and the reduction in power consumption by a compressor at low entrance temperatures. Fundamentally two types of cooling are known: cooling the inlet air flowing into the compressor and intermediate cooling between the two separate compressor stages.

For inlet cooling, different techniques are used, including methods that work with water spraying. When a small amount of water is sprayed (typically less than 1% of the air mass flow) and completely evaporates, cooling is achieved due to the uptake of heat of evaporation. On the other hand, cooling due to uptake of sensible heat in direct contact of air and water is possible. This is proposed in the unexamined German Patent DE-A1-199 13 681. To achieve a significant cooling, relatively large quantities of water are required here and a large contact area between the liquid phase and the air to be cooled is required. This can thus be achieved by atomization of the water into fine droplets. For example, DE-A1-199 13 681 proposes using a trickle cooler for this purpose. It should also be pointed out that an additional cooling may also occur with this type of cooling due to partial evaporation of the water. Whether evaporation occurs depends on the final temperature reached. If the final temperature is low enough, no water enters the vapor phase. Then it is even possible to condense water out of the intake air.

Use of water for inlet cooling limits the applicability of the method to sufficiently warm ambient temperatures at which there is no risk of freezing (approx. >10° C.). In corresponding heat exchangers with indirect cooling (water and air do not come in direct contact), there is fundamentally the possibility of counteracting the formation of ice by adding antifreeze. This possibility does not exist with direct spraying of water into the stream of air.

Intermediate cooling of the air during compression as is disclosed in DE-A1-42 37 665 reduces the power consumption of a turbo compressor as a result of reducing the compression work. In contrast with inlet cooling, however, no increase in the air mass flow is achieved in this way. In most cases, traditional heat exchangers are used for the intermediate cooling. In recent times however there have been increased efforts to achieve the desired cooling by spraying water. This is known for example from EP-A1-0 770 771. With this method, in the past the concept of cooling by vaporization has been pursued exclusively, whereby finely atomized demineralized water is sprayed into the air stream. This takes place either in the interior of the compressor between the individual compressor stages (so-called "spray intercooling") or upstream from the compressor in the air intake. The amount of water added is normally low in these applications, namely between 0.5% and 1.5% of the mass flow of air. Cooling of the air here takes places almost exclusively through uptake of heat of evaporation by the water, but the exchange of sensible heat between gas and liquid water plays practically no role at all.

A considerable disadvantage of intermediate cooling by evaporation is the water loss. The liquid water sprayed in cannot in most cases be recovered economically from the exhaust and is discharged into the atmosphere. This can be a considerable problem, especially in regions of water shortage. With this type of intermediate cooling there are also technical problems due to the presence of liquid water in the compressor blades. This can lead to erosion and corrosion and also alters the aerodynamic properties of the blades.

SUMMARY OF THE INVENTION

The present invention thus relates to providing a method for operating a compressor with which the efficiency can be increased easily while avoiding the disadvantages known from the state of the art.

According to this invention, a liquid medium is sprayed into the gaseous medium in the intermediate cooler so that a two-phase flow with a liquid phase and a gaseous phase develops in the intermediate cooler, with the gaseous medium being cooled by heat transfer from the gaseous medium to the liquid medium and the liquid phase being deposited before entrance into the downstream compressor stage.

Cooling by spraying water is not accomplished or not exclusively by uptake of evaporation energy but instead by the uptake of sensible heat, i.e., an increase in temperature of the liquid medium makes a significant contribution.

To achieve the desired heat transfer by direct contact between the liquid and gaseous phases in the intermediate cooler, the water must be atomized into the finest possible droplets while being sprayed. For example, the liquid medium can be atomized into droplets with a droplet size of less than 100 μm when it is sprayed into the intermediate cooler.

The liquid phase condensed out of the intermediate cooler can be reused to advantage by recooling it in a cooler and then spraying it back into the intermediate cooler.

Furthermore, it is advantageous for this invention if the intermediate cooling due to water spraying presented here takes place downstream from the low pressure part of the compressor at a pressure level below 3 bar. This is important to avoid greater losses of efficiency of the system as a whole despite the dissipation of heat to the outside. To ensure adequate cooling, the liquid medium may advantageously be sprayed in the intermediate cooler at a temperature of less than 5° C.

In an exemplary embodiment of this invention, the gaseous medium is air that is compressed in the compressor and the liquid medium sprayed into the air is water sprayed in the intermediate cooler.

BRIEF DESCRIPTION OF THE DRAWINGS

This invention will now be illustrated on the basis of the accompanying figures, in which.

Only the elements essential to this invention are shown. The same elements are labeled in the same way in different figures.

DETAILED DESCRIPTION OF THE PREFERRED EMBODIMENTS

Figure 1:
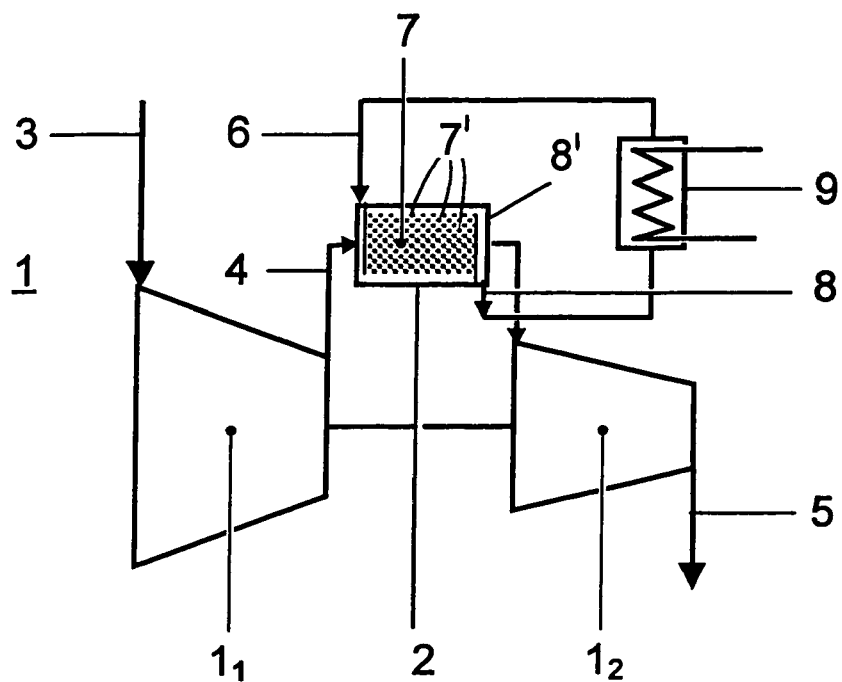
FIG. 1 shows an exemplary embodiment of a compressor having an inventive intermediate cooler.

As shown in FIG. 1, the invention is based on a compressor 1 having an intermediate cooler 2 which is situated between two compressor stages $1_1$, $1_2$. Inlet air 3 flows into the first compressor stage $1_1$ which constitutes the low pressure part of the compressor 1. The partially compressed air 4 discharged from the compressor stage $1_1$ is cooled in the intermediate cooler 2 before being compressed further in the second compressor stage $1_2$ to yield a certain final pressure. The completely compressed air 5 is then introduced into the combustion chamber of a gas turbine (not shown here), for example, or used for some other suitable purpose.

According to this invention, the intermediate cooling in the intermediate cooler 2 is performed by spraying in water 6 so that the cooling is not induced or not exclusively by uptake of evaporation energy but instead the uptake of sensible heat makes a significant contribution. The addition of water 6 takes place at a suitable installation downstream from the first compressor stage $1_1$, i.e., downstream from the low pressure part of the compressor. Thus a two-phase flow 7 with a gas phase and a liquid phase develops in the intermediate cooler. Before entering the next compressor stage $1_2$ downstream, the liquid phase is separated while the gas phase is further compressed. This may be accomplished by a droplet separator 8'. The separated water 8 is recooled in the cooler 9 and then sprayed again into the interim cooler 2. A refrigeration machine or some other suitable heat trap (e.g., vaporization of liquefied natural gas) is also conceivable as cooler 9. It is also conceivable to use this type of cooling with water spraying and condensation multiple times during the compressor process.

Of course this invention is not limited to air and water but instead also includes in general compression of a gaseous medium with spray injection of a liquid medium.

For this procedure, the technical difficulties of a two-phase compression are avoided in the compressor 1. Due to the higher temperatures prevailing at the spray site after partial compression, the restriction of inlet cooling to favorable climatic conditions, as mentioned in conjunction with the state of the art is avoided. Furthermore, it is advantageous for this invention if the intermediate cooling depicted here is performed by water spraying downstream from the low pressure part of the compressor 1 at a pressure level below 3 bar. This is important to avoid major losses of efficiency of the system as a whole despite the release of heat outward. It is advisable here to perform the release of energy at a temperature level which is below the temperature of the exhaust of the entire system. In a combination power plant, the temperature of the exhaust is typically 90° C. To ensure adequate cooling, the liquid medium in the intermediate cooler should advantageously be sprayed in at a temperature of less than 5° C.

Figure 2:
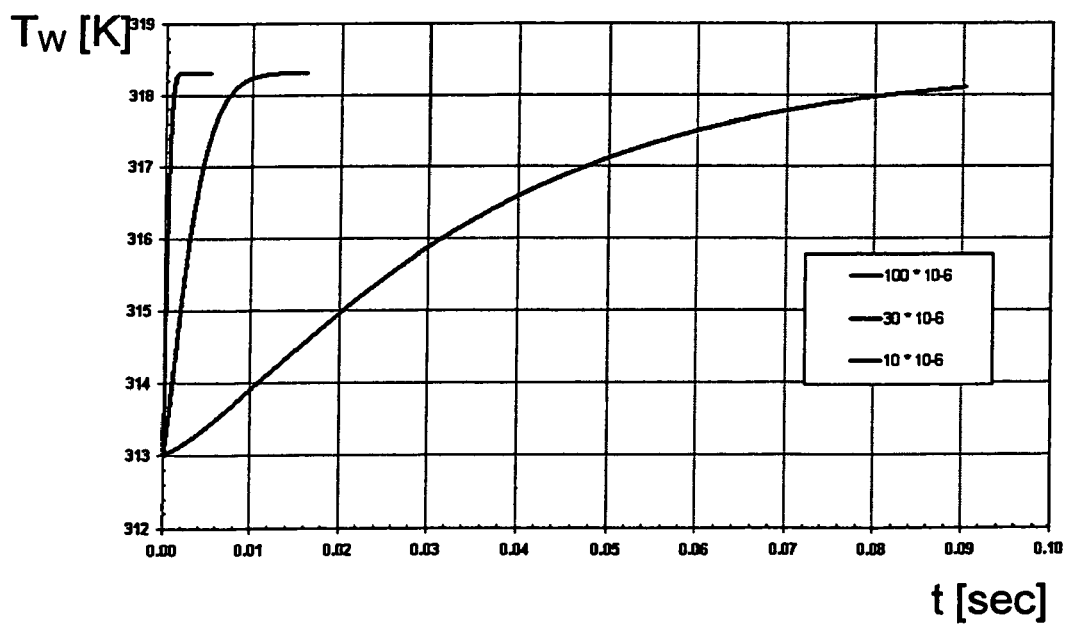
FIGS. 2–4 show plots of droplet temperature $T_W$, air temperature $T_L$ and vapor content $\phi$ as a function of time in a water-air mixture at various droplet diameters of 10, 30 and 100 μm.
Figure 3:
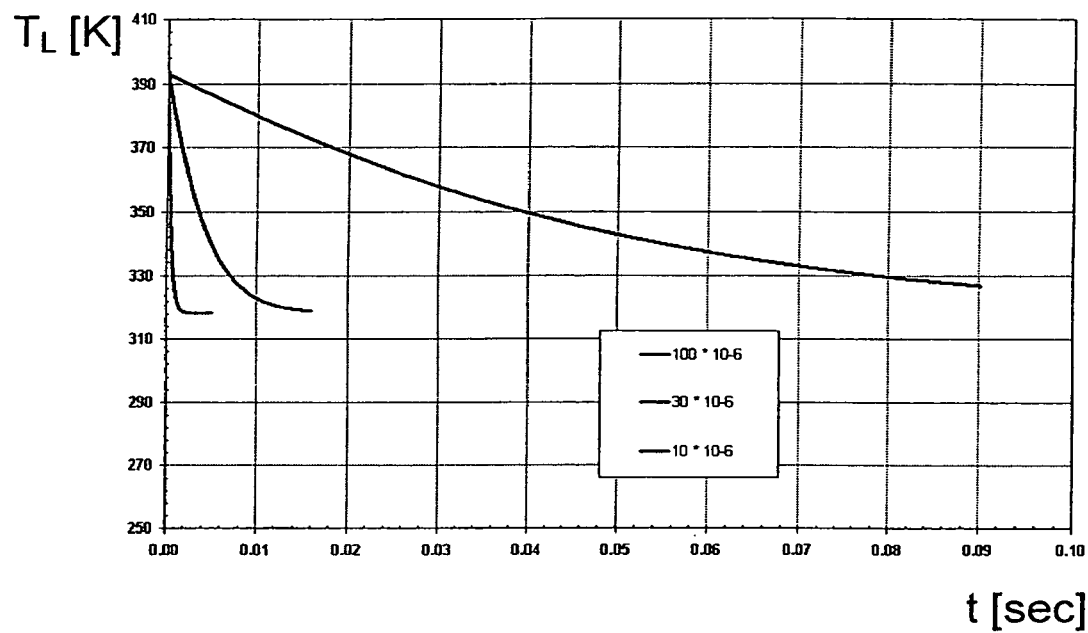
Figure 4:
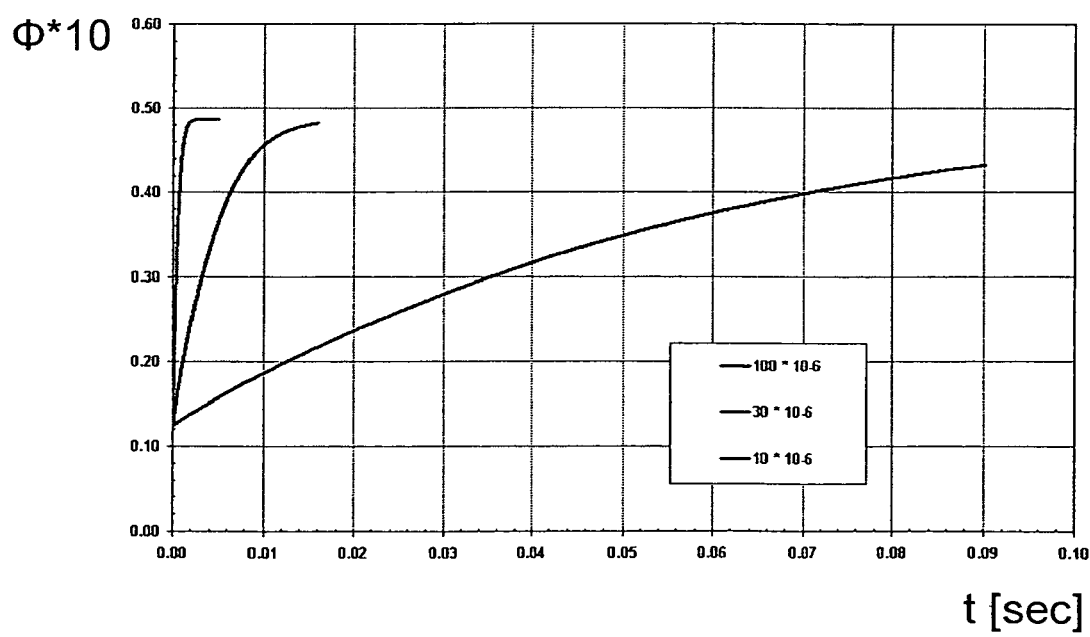

The desired heat transfer in the intermediate cooler 2 in direct contact between water and air presupposes an adequately large contact area between the two faces within the two-phase flow 7. This requires atomization of the water to yield the finest possible droplets 7' during spray injection. The curves in FIGS. 2 through 4 give an idea of the influence of droplet size on the changes of state of the liquid and gaseous phases. These figures show the changes in water temperature $T_W$ (FIG. 2), air temperature ($T_L$) (FIG. 3) and steam content $\phi$ (FIG. 4) in an air-water mixture as a function of time, where the initial temperature of the water is $T_W$=40° C., the initial temperature of the air is $T_L$=120° C. and the system pressure is p=2.5 bar. This shows the results for three different droplet sizes d of 10 μm, 30 μm and 100 μm. The mass ratio of air to water is set at 1, the vapor content $\phi$ of air at the beginning corresponds to a relative humidity of approx. 50% at ambient pressure and ambient temperature. The curves were calculated by solving numerically the basic equations for the heat and mass transfer in a two-phase flow. As indicated by these curves, the equilibrium point of the mixture is at approx. 45° C., with the vapor content $\phi$ increasing by a factor of approx. 4 by that point in time. The speed at which the mixture tends toward equilibrium depends greatly on droplet size. For droplets with a diameter of d=10 μm, the equilibrium is reached approx. 100 times more rapidly than with droplets of the size d=100 μm. It is fundamentally true that droplet size must be small enough to obtain good heat exchange but large enough to allow the droplets to easily settle out again. In the present example, cooling takes place through evaporation as well as through uptake of sensible heat, with the latter constituting approximately 25% of the total cooling power. However, this percentage can be increased significantly by increasing the quantity of water added. In the limiting case of extremely large quantities of water and/or sufficiently low water temperatures at the inlet, evaporation of water may be completely suppressed.

To get an estimate of the design size of the intermediate cooler 2, the approximate amount of time needed to reach the equilibrium state is multiplied by the planned flow rate in the heat exchanger. In the present case, a design length of only 0.5 m is calculated for very small droplet sizes of d=10 μm at an assumed air speed of U=150 m/s in the compressor 1. This would allow compact integration of the heat exchanger into the compressor 1. For large droplets of d=100 μm, however, a significantly larger heat exchanger with a design length of 3 to 4 meters and a velocity of flow reduced to approx. U=20–30 m/s would appear to be necessary. However, it must be pointed out here that the results presented apply to the case when there is no relative movement between the droplets and the air. In practice, however, the speeds of air and water droplets will differ from one another, thus leading to an increased exchange of heat and more rapid evaporation. This reduces the required design length of a heat exchanger (or allows greater velocities of flow at a given design length).

LIST OF DESIGNATIONS 1 compressor
$1_1$, $1_2$ compressor stages
2 intermediate cooler
3 gaseous medium, inlet air
4 partially compressed air 5 completely compressed air
6 liquid medium, water
7 two-phase flow
8 water separated
9 cooler
d droplet diameter
$T_W$ temperature of liquid phase in intermediate cooler 2
$T_L$ temperature of gaseous phase in intermediate cooler 2
p pressure
t time
U speed of two-phase flow 7
φ vapor content

What is claimed is:

1. A method of operating a compressor of a gas turbine comprising:
   compressing a gaseous medium in a first compressor stage of the gas turbine to create a partially compressed medium;
   cooling the partially compressed medium in an intermediate cooler, wherein at least about 25% of total cooling power occurs through uptake of sensible heat;
   further compressing the partially compressed medium in a second compressor stage of the gas turbine downstream of the intermediate cooler;
   wherein an atomized liquid medium is sprayed into the partially compressed medium in the intermediate cooler so that a two-phase flow develops therein including a liquid phase and a gaseous phase, the partially compressed medium being cooled by heat transfer from the partially compressed medium to the liquid medium and the liquid medium being separated before entering the second compressor stage; and
   wherein contact area developed directly by the two-phase flow provides substantially all of the cooling of the partially compressed medium in the intermediate cooler.

2. The method of claim 1, wherein the partially compressed medium is cooled by an increase in temperature of the liquid medium.

3. The method of claim 2, wherein the partially compressed medium is additionally cooled by evaporation of the liquid medium.

4. The method of claim 1, wherein the liquid medium is atomized into droplets when sprayed into the intermediate cooler.

5. The method of claim 4, wherein the liquid medium is atomized into droplets having a droplet size of less than 100 μm when sprayed into the intermediate cooler.

6. The method of claim 4, wherein the droplets are deposited by a droplet separator.

7. The method of claim 1, wherein the liquid phase separated from the intermediate cooler is cooled and then sprayed again into the intermediate cooler.

8. The method of claim 1, wherein during compression the partially compressed medium is repeatedly cooled intermediately by spraying and separating a liquid medium.

9. The method of claim 1, wherein the gaseous medium is compressed in the first compressor stage from ambient pressure to a pressure of less than 3 bar before being sent to the intermediate cooler where the liquid medium is sprayed in.

10. The method of claim 9, wherein the liquid medium is sprayed into the intermediate cooler at a temperature of less than 5° C.

11. The method of claim 1, wherein the gaseous medium comprises air and the liquid medium comprises water.

12. A method of operating a compressor of a gas turbine comprising:
   compressing a gaseous medium in a first compressor stage of the gas turbine to create a partially compressed medium;
   cooling the partially compressed medium in an intermediate cooler by spraying liquid medium in atomized droplets in the intermediate cooler so that the partially compressed medium is cooled by heat transfer from the partially compressed medium to the liquid medium, wherein at least about 25% of total cooling power occurs through uptake of sensible heat;
   directing the atomized droplets of the liquid medium away from the partially compressed medium before the droplets enter the second compressor stage;
   further compressing the partially compressed medium in a second compressor stage of the gas turbine downstream of the intermediate cooler;
   wherein contact area developed directly by flow of the atomized droplets and the partially compressed medium provides substantially all of the cooling of the partially compressed medium in the intermediate cooler.

13. The method of claim 12, wherein the partially compressed medium is cooled with a corresponding increase in temperature of the liquid medium.

14. The method of claim 12, wherein the partially compressed medium is cooled by evaporation of the liquid medium.

15. The method of claim 14, wherein the atomized droplets have a droplet size of less than 100 μm when sprayed into the intermediate cooler.

16. A method of operating a compressor of a gas turbine comprising:
   compressing a gaseous medium in a first compressor stage of the gas turbine to create a partially compressed medium;
   passing the partially compressed medium through an intermediate cooler and spraying atomized droplets of a liquid medium therein so that the partially compressed medium is cooled by heat transfer to the liquid medium, wherein at least about 25% of total cooling power occurs through uptake of sensible heat;
   removing the atomized droplets from the intermediate cooler before the atomized droplets enter the second compressor stage;
   further compressing the partially compressed medium in a second compressor stage of the gas turbine downstream of the intermediate cooler;
   wherein a two-phase flow develops in the intermediate cooler with contact area between the atomized droplets and the partially compressed medium of the two-phase flow providing substantially all of the cooling of the partially compressed medium in the intermediate cooler.

17. The method of claim 16, wherein the partially compressed medium is cooled with a corresponding increase in temperature of the liquid medium.

18. The method of claim 16, wherein the partially compressed medium is cooled by evaporation of the liquid medium.

19. The method of claim 18, wherein the atomized droplets have a droplet size of less than 100 μm when sprayed into the intermediate cooler.

20. The method of claim 16, further comprising cooling the liquid medium removed from the intermediate cooler and recirculating the liquid medium for spraying into the intermediate cooler.

21. A method of operating a gas turbine comprising:
compressing a gaseous medium in a first, low pressure compressor stage of the gas turbine to create a partially compressed medium;
cooling the partially compressed medium in an intermediate cooler, wherein at least about 25% of total cooling power occurs through uptake of sensible heat;
further compressing the partially compressed medium in a second compressor stage of the gas turbine downstream of the intermediate cooler;
wherein an atomized liquid medium is sprayed into the partially compressed medium, at a temperature of less than 5 ° C. and a pressure of less than 3 bar, while the partially compressed medium is in the intermediate cooler so that a two-phase flow develops therein including a liquid phase and a gaseous phase;
wherein the partially compressed medium is cooled by heat transfer from the partially compressed medium to the liquid medium and the liquid medium is separated before entering the second compressor stage; and
wherein contact area developed directly by the two-phase flow provides substantially all of the cooling of the partially compressed medium in the intermediate cooler.

* * * * *